Dec. 16, 1952     C. J. THOMAS     2,622,088
ETHYLENE OXIDE PRODUCTION AND RECOVERY
Filed June 29, 1950
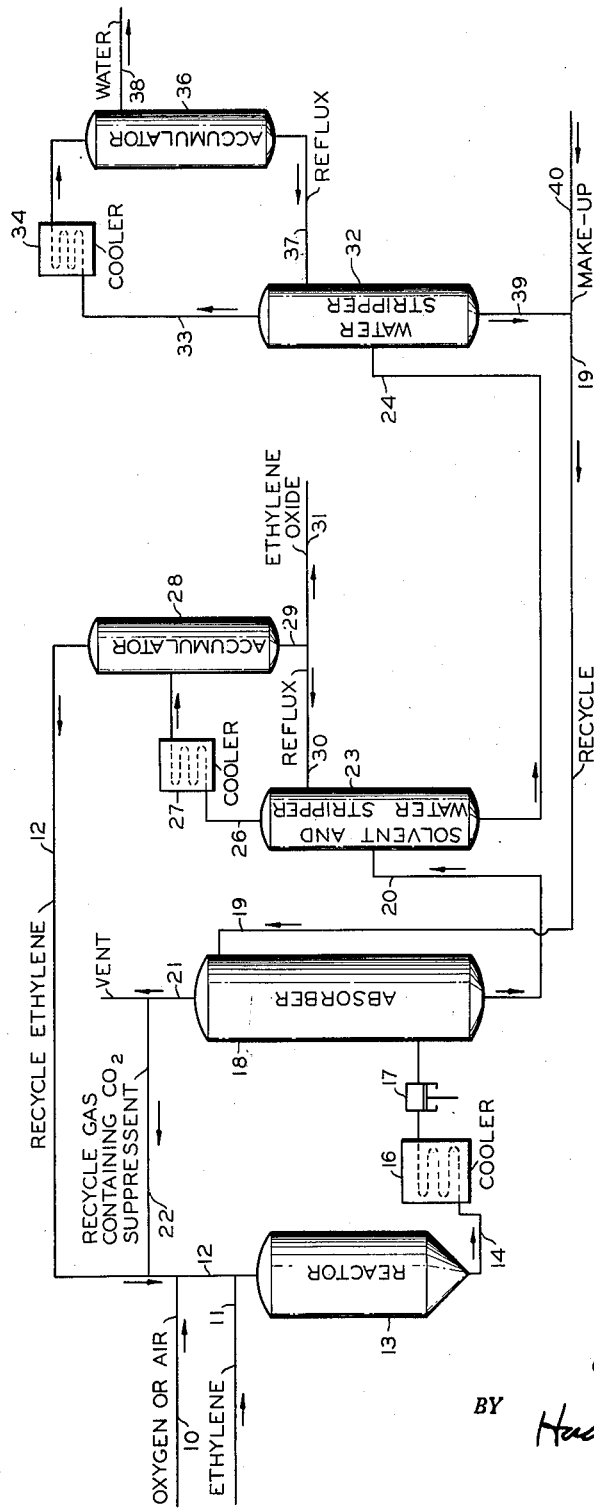
INVENTOR.
C. J. THOMAS
BY Hudson & Young
ATTORNEYS Patented Dec. 16, 1952

2,622,088

UNITED STATES PATENT OFFICE 2,622,088

ETHYLENE OXIDE PRODUCTION AND RECOVERY

Clarence Jack Thomas, Bartlesville, Okla., assignor to Phillips Petroleum Company, a corporation of Delaware Application June 29, 1950, Serial No. 171,008

11 Claims. (Cl. 260—348.5)

This invention relates to a combination process for producing ethylene oxide and recovering same. In one of its more specific aspects this invention relates to the use of halogenated organic compounds selected from the group consisting of halogenated aromatics, paraffins, cycloparaffins, and ethers for absorbing ethylene oxide and for use as carbon dioxide suppressants in the production of ethylene oxide. One specific embodiment of my invention relates to the recovery of ethylene oxide by absorption in a chlorinated aliphatic ether and the use of a portion of said chlorinated aliphatic ether as a suppressant for carbon dioxide formation during the oxidation of ethylene to produce ethylene oxide.

The art available on the production of ethylene oxide is quite voluminous, particularly in the disclosure of catalysts for ethylene oxidation. They range from silver activated with gold, copper, iron, and so forth, to tetraethyl lead, oxides of selenium, lead, antimony, etc. Various supports are also disclosed, including Alundum, corundum, pumice, Filtrols, silicon. and the like. Also, there is mentioned the use of carbon dioxide formation suppressants in the ethylene oxidation such as halogens, compounds of halogens, aromatic amines, non-basic compounds containing nitrogen, etc. The reaction conditions disclosed are temperatures ranging between 150 and 400° C. and pressures ranging from atmospheric to super-atmospheric. None of this art, however, discloses the process of applicant wherein a halogenated organic compound is utilized as the solvent for produced ethylene oxide, and also as the suppressant for the formation of carbon dioxide during the ethylene oxidation reaction.

It is an object of this invention to provide a combination process for the production of ethylene oxide and the recovery thereof.

Another object is to provide a new group of solvents for absorbing ethylene oxide and for suppressing carbon dioxide formation during ethylene oxidation.

Other objects and advantages will be apparent to those skilled in the art from the accompanying discussion and disclosure.

I have discovered an improved method for producing ethylene oxide whereby a halogenated organic solvent is employed to recover the ethylene oxide product from the ethylene oxidation reaction effluent, and whereby a portion of said solvent is cycled to the reaction zone where it acts as a suppressant to carbon dioxide formation.

The exact mechanism by which these compounds suppress carbon dioxide formation is not fully understood, and I do not intend to be limited or restricted by any particular theory therefor.

In accordance with my invention, ethylene is oxidized at a temperature in the range of 150 to 400° C. and at a pressure in the range of atmospheric to 15 atmospheres in the presence of a catalyst suitable for said oxidation, such as a supported activated silver catalyst containing 5 to 40 weight per cent silver. The catalyst may be either in a fixed bed, as preferred, or in a fluidized bed. The feed stream to such a reaction comprises a gas containing 3 to 60 volume per cent of ethylene, and in addition, a minor quantity of a halogenated organic compound recycled from the ethylene oxide absorption step described as hereinafter. When the oxidant is air it is desirable to use 5 to 15 volume per cent ethylene with 85 to 95 volume per cent air, while if the oxidant is oxygen, 30 to 60 volume per cent ethylene is used with 70 to 40 volume per cent $O_2$. Oxygen used in a quantity above 70 per cent does not improve the yield of ethylene oxide product. (By oxygen, I mean process oxygen which is relatively pure.)

The compounds which I usually prefer to employ, both as the solvents for ethylene oxide and as the carbon dioxide formation suppressants are halogen-containing aromatics, paraffins, cycloparaffins, and ethers. Of the halogenated ethers disclosed, I wish to include only those which have no halogen substitution on the alpha carbon atoms, since it is known that such compounds are generally highly reactive and decompose on contact with water. Broadly, the compounds within these groups which I choose to use are those which are liquid at the disclosed absorption temperatures and pressures. It is usually most economical to employ those solvents which do not require refrigeration, however, I may use any of those halogenated compounds boiling within the range of 35 to 350° C., and preferably in the range of 150 to 250° C. Examples of compounds suitable for use as selective solvents for ethylene oxide while serving at the same time as carbon dioxide formation suppressants during the oxidation of ethylene are: mono-, di-, and tri-halogenated aromatics typified by benzene, naphthalene, and homologues thereof including bromobenzene, triodobenzene, fluorotoluenes, bromonaphthalenes, dichloronaphthalenes; mono-, di-, and tri-halogenated paraffins such as the $C_2$ to $C_{12}$ and higher compounds exemplified by dichloroethane, bromo-octanes, butyl fluorides, and the like; mono-, di-, and tri-halogenated cycloparaffins exemplified by cyclohexylchlorides, cyclopentyl bromides; and mono-, di-, and tri-halogenated ethers, preferably those containing 4 to 8 carbon atoms per molecule typified by β-monochloroethylether, β, β' - dichloroethyl - n - propyl ether, β, γ-dichloroethyl-n-propyl ether, bis (α-methyl-β-chloroethyl) ether,γ,γ'-dichlorodipropyl ether, α methyl-β-chloroethyl-n-propyl ether, γ-monochlorodibutyl ether, β,β',γ-trichlorodibutyl ether, β,β',γ - trichloroethyl - n - propyl ether, and the like. Of all the di- and tri-halogenated solvents covered by my invention I mean also to include the mixed halogenated materials, i. e., those containing two or more different halogen atoms. Because of their availability and utility I usually choose to employ $\beta,\beta'$-dichlorodiethyl ether or bis($\alpha$-methyl-$\beta$-chloroethyl) ether, however, others of the solvents included are quite satisfactory, as are mixtures thereof.

The effluent from the air oxidation reaction comprises a gaseous material usually containing from 3–5 volume per cent ethylene oxide, while if relatively pure oxygen is used it can be as high as 30 per cent. This material is fed to an absorber where it is contacted in countercurrent flow with a solvent of my invention at a pressure in the range of atmospheric to 200 p. s. i. a., and a temperature in the range of 0 to 100° C. The minimum temperature of the absorption is set by the freezing point of water, which is always present. I prefer to contact the reactor effluent with from 0.5 to 2.0 mols of solvent per mol of gas. The pressure, temperature, and flow rates of gas and solvent in the absorber are so correlated that the overhead non-absorbed material, which will include a certain amount of ethylene and carbon dioxide, will contain a prescribed amount of the halogenated compound of my invention for use in the oxidation reactor. The quantity of this material passed to the ethylene oxidation is such that 0.01 to 0.1 volume per cent of halogen is introduced based on the total volume of feed to the oxidation reactor. The absorbed ethylene oxide, solvent, and water are treated to remove water and solvent from the oxide and then to remove water from the solvent. The ethylene oxide is recovered as the useful product, the solvent is recycled to the absorption zone, and the water is either discarded or recovered for use as feed to, say, steam production or for other plant uses.

A more detailed understanding of some of the many aspects of my invention may be had by referring to the attached drawing, which is a schematic flow diagram of a preferred modification of my invention. Various valves, pumps, and other conventional equipment necessary for the practice of my invention will be familiar to one skilled in the art and have been omitted from the drawing for the sake of clarity. This description provides one method of operating my process. However, it is understood that while this is representative in general of my process, various minor changes may be made in adapting it to the various conditions within the scope of the invention.

Refer now to the drawing. Oxygen or air and ethylene are introduced to line 12 through lines 10 and 11 respectively in proportions disclosed hereinabove. The mixture of these materials is then passed to the oxidation reactor 13 where they are contacted with a suitable catalyst and at conditions such that optimum quantities of ethylene oxide are produced. Effluent from the reactor is removed therefrom through line 14 and is cooled and compressed in cooler 16 and compressor 17. This gas is then passed to absorber 18 where it is contacted in countercurrent flow with an absorbent of my invention for the ethylene oxide contained therein. The lean absorbent is introduced to the absorber via line 19 and the rich absorbent is removed therefrom via line 20. The operation of this zone is maintained such that a small quantity of the absorbent is allowed to pass overhead with the unabsorbed gases, such as unreacted ethylene, carbon dioxide, and the like. These materials containing the small portion of absorbent are withdrawn through line 21 and a portion or all of them passed via line 22 to line 12 and therefrom back to the reactor. In this manner the absorbent for the ethylene oxide, which also acts as a carbon dioxide formation suppressant, is introduced to the reactor in the desired quantities. To prevent the build-up of gases in the recycle a vent in line 21 is provided. The rich absorbent from the bottom of the absorber is passed via line 20 to solvent and water stripper 23 in which the solvent and water are separated from the ethylene oxide and traces of ethylene, and are withdrawn from the bottom thereof via line 24. The overhead fraction comprising primarily ethylene oxide is withdrawn through line 26 and is passed through cooler 27 to accumulator 28 where the liquid ethylene oxide is separated from the vaporous ethylene. The uncondensed ethylene is recycled from this accumulator via line 12 to reactor 13. The product ethylene oxide is removed therefrom through line 29. A portion of this product can be passed through line 30 back to the stripping zone to act as reflux while the remaining portion is recovered through line 31. The water and lean absorbent are passed to stripper 32 where the water is separated from the absorbent and is taken overhead through line 33 as a vapor. The vapor is condensed by cooler 34 and is recovered in accumulator 36. A portion of the water from this accumulator may be recycled as reflux through line 37. The remaining portion of the water is withdrawn through line 38. Absorbent, free of absorbed ethylene oxide and free of water, is withdrawn from stripper 32 through line 39 and is recycled therefrom through line 19 to absorber 18. Make-up absorbent is introduced to the system through line 40.

Advantages of this invention are illustrated by the following example. The reactants and their proportions and other specific ingredients are presented as being typical and should not be construed to limit the invention unduly.

*Example*

In an apparatus of the type disclosed in the attached drawing, oxygen and ethylene in a mol ratio of 1.5:1 are reacted in the presence of a stationary catalyst comprising activated silver supported on an inert material. The temperature of the reaction is maintained at about 300° C., while the pressure is substantially atmospheric. The effluent material is passed to an absorber having 10 theoretical plates, and is contacted therein with $\beta,\beta'$-dichlorodiethyl ether in a ratio of solvent to gas of 1.1 mol per mol. The absorber pressure is maintained at 50 p. s. i. a., while the temperature is maintained at 38° C. The absorber is operated so that sufficient absorbent passes overhead with the recycle gas to provide approximately 0.1 volume per cent of said absorbent in the gases to the oxidation reactor.

The effluent gas from the reactor contains 5 volume per cent of ethylene oxide which is absorbed by countercurrent contacting the reactor effluent with the absorbent. After absorbing the ethylene oxide, the rich absorbent is then stripped of the oxide and a minor quantity of ethylene. These materials are then passed to an accumulator after cooling, from which an ethylene oxide product is withdrawn of 99.9 per cent purity.

The principal advantage of my invention is that I have discovered that a particular group of halogenated organic compounds may be used as selective solvents for ethylene oxide and concomitantly as carbon dioxide suppressants. By utilizing one or more of the useful compounds covered by my invention both the ethylene oxide absorbent and carbon dioxide suppressant are introduced to the system at the same point, thereby simplifying operation considerably.

Although this invention has been described and exemplified in terms of its preferred modifications, it is understood that various changes may be made without departing from the spirit and scope of the disclosure and of the claims.

I claim:

1. A method for the production and recovery of ethylene oxide which comprises contacting an effluent stream from an ethylene oxidation process with a halogenated organic compound selected from the group consisting of halogenated aromatics, paraffins, cycloparaffins, and ethers boiling within the range of 35 to 350° C. and thereby selectively absorbing the ethylene oxide preferentially to the other components of said effluent stream, recycling at least a portion of the unabsorbed gas to the ethylene oxidation, carrying out said absorption such that a minor quantity of said solvent is carried back to said oxidation where it inhibits the formation of carbon dioxide, desorbing the ethylene oxide enriched solvent, and recovering ethylene oxide as a product of the process.

2. A method for the production and recovery of ethylene oxide which comprises contacting an effluent stream from a catalytic ethylene oxidation process with a halogenated organic compound selected from the group consisting of halogenated aromatics, paraffins, cycloparaffins, and ethers boiling in the range of 35 to 350° C. and thereby selectively absorbing the ethylene oxide preferentially to the other components of said effluent stream, recycling at least a portion of the unabsorbed gas to the ethylene oxidation with a sufficient quantity of absorbent therein such that the halogen content thereof is equivalent to 0.01 to 0.1 volume per cent of the total feed to said oxidation, separating the absorbed ethylene oxide from said absorbent, and recovering same as a product of the process.

3. A method for the production and recovery of ethylene oxide which comprises catalytically oxidizing ethylene with an oxygen containing gas, contacting the effluent from said oxidation containing 3 to 30 volume per cent ethylene oxide with a halogenated organic compound selected from the group consisting of halogenated aromatics, paraffins, cycloparaffins, and ethers containing 1 to 3 halogen atoms per molecule in a mol ratio of effluent to halogenated hydrocarbon in the range of 0.5:1 to 2:1, a temperature in the range of 0 to 100° C., and a pressure in the range of atmospheric to 200 p. s. i. a., and thereby causing the ethylene oxide to be selectively absorbed in said halogenated hydrocarbon, recycling at least a portion of the unabsorbed effluent gas to said oxidation with a sufficient quantity of said halogenated hydrocarbon therein such that the halogen content thereof is equivalent to 0.01 to 0.1 volume per cent of the total feed to said oxidation, said halogenated hydrocarbon suppressing the formation of carbon dioxide in said oxidation, separating absorbed ethylene oxide from said halogenated hydrocarbon, and recovering same as a product of the process.

4. A method according to claim 3 wherein said oxygen containing gas used to oxidize ethylene is oxygen which is fed to said oxidation in a volume ratio to ethylene of 70:30 to 40:60.

5. A method according to claim 3 wherein said oxygen containing gas used to oxidize ethylene is air which is fed to said oxidation in a volume ratio to ethylene of 95:5 to 85:15.

6. A method according to claim 3 wherein said halogenated hydrocarbon is $\beta,\beta'$-dichlorodiethyl ether.

7. A method according to claim 3 wherein said halogenated hydrocarbon is dichloroethane.

8. A method according to claim 3 wherein said halogenated hydrocarbon is bis($\alpha$-methyl-$\beta$-chloroethyl) ether.

9. A method for the production and recovery of ethylene oxide which comprises oxidizing ethylene with pure oxygen in the presence of a supported activated silver catalyst containing 5 to 40 weight per cent silver, feeding oxygen and ethylene to said oxidation in a volume ratio of 70:30 to 40:60 respectively, oxidizing the ethylene at a temperature in the range of 150 to 400° C. and a pressure in the range of atmospheric to 15 atmospheres, cooling the effluent gas from said ethylene oxidation containing 3 to 30 volume per cent ethylene oxide, countercurrently contacting said cooled gas with a $C_4$ to $C_8$ halogenated ether containing 1 to 3 halogen atoms per molecule, none of which are attached to the alpha carbon atoms, and boiling within the range of 150 to 250° C. in a mol ratio in the range of 0.5:1 to 2:1, said ether being halogenated in other than the alpha position, carrying out said contacting at a temperature in the range of 0 to 100° C., and a pressure of atmospheric to 200 p. s. i. a., thereby selectively absorbing the ethylene oxide in said halogenated ether, recycling at least a portion of the unabsorbed effluent gas containing unreacted ethylene and a sufficient amount of halogenated ether such that the halogen content thereof is equivalent to 0.01 to 0.1 volume per cent of the total feed to said oxidation, said halogenated ether suppressing the formation of carbon dioxide during said oxidation, stripping absorbed ethylene oxide from said halogenated ether, separating minor quantities of ethylene from said ethylene oxide and recovering ethylene oxide in a purity of 99.9 volume per cent, separating water from said halogenated ether from which the ethylene oxide has been removed, and recycling the solvent to said contacting with the effluent from said ethylene oxidation.

10. A method according to claim 9 wherein said halogenated hydrocarbon is $\beta,\beta'$-dichlorodiethyl ether.

11. A method according to claim 9 wherein said halogenated hydrocarbon is bis($\alpha$-methyl-$\beta$-chloroethyl) ether.

CLARENCE JACK THOMAS.

REFERENCES CITED

The following references are of record in the file of this patent:

UNITED STATES PATENTS

| Number | Name | Date |
|---|---|---|
| 2,279,469 | Law | Apr. 14, 1942 |

FOREIGN PATENTS

| Number | Country | Date |
|---|---|---|
| 813,582 | France | 1937 |
| 485,033 | Great Britain | 1938 |

OTHER REFERENCES

Kaplan: Chem. Abstr., vol. 31, 1937, p. 4554.